United States Patent
Bookbinder et al.

(10) Patent No.: US 11,072,560 B2
(45) Date of Patent: Jul. 27, 2021

(54) NEUTRALIZING GAS SYSTEM FOR FURNACE

(71) Applicant: Corning Incorporated, Corning, NY (US)

(72) Inventors: Dana Craig Bookbinder, Corning, NY (US); Richard Michael Fiacco, Corning, NY (US); Pushkar Tandon, Painted Post, NY (US)

(73) Assignee: CORNING INCORPORATED, Corning, NY (US)

(*) Notice: Subject to any disclaimer, the term of this patent is extended or adjusted under 35 U.S.C. 154(b) by 204 days.

(21) Appl. No.: 16/100,922

(22) Filed: Aug. 10, 2018

(65) Prior Publication Data

US 2019/0062208 A1    Feb. 28, 2019

Related U.S. Application Data

(60) Provisional application No. 62/551,372, filed on Aug. 29, 2017.

(30) Foreign Application Priority Data

Oct. 26, 2017  (NL) .................................... 2019811

(51) Int. Cl.
*C03C 25/68* (2006.01)
*C03B 37/012* (2006.01)
*C03B 37/014* (2006.01)

(52) U.S. Cl.
CPC .......... *C03C 25/68* (2013.01); *C03B 37/0146* (2013.01); *C03B 37/01228* (2013.01); *C03B 37/01446* (2013.01); *C03B 37/01466* (2013.01)

(58) Field of Classification Search
CPC ........ C03B 37/01228; C03B 37/01446; C03B 37/0146; C03B 37/01466; C03C 25/68
See application file for complete search history.

(56) References Cited

U.S. PATENT DOCUMENTS

| | | | |
|---|---|---|---|
| 4,741,748 A | | 5/1988 | Lane et al. |
| 5,180,410 A | * | 1/1993 | Berkey ............. C03B 37/01446 65/403 |
| 2013/0000840 A1 | | 1/2013 | Dawes et al. |

FOREIGN PATENT DOCUMENTS

| | | |
|---|---|---|
| EP | 0484659 A2 | 5/1992 |
| JP | 60239339 A | 11/1985 |
| WO | 0236510 A2 | 5/2002 |

OTHER PUBLICATIONS

JP 60239339 machine translation, Kyodo et al., Preparation of parent material for optical fiber, Nov. 1985 (Year: 1985).*
International Search Report and Written Opinion PCT/US2018/048224 dated Nov. 27, 2018, 13 pgs.
Netherlands Patent Application No. 2019811 Search Report dated Jul. 5, 2018; 11 Pages; European Patent Office.

* cited by examiner

*Primary Examiner* — Queenie S Dehghan
(74) *Attorney, Agent, or Firm* — Robert L. Carlson

(57) ABSTRACT

A method of preparing an optical preform, comprises the steps of: positioning an optical preform comprising silica within a cavity of a furnace; passing an etchant gas into the furnace and at least one of through an open channel defined in the optical preform and around the optical preform; and passing a neutralizing gas into the cavity of the furnace, the neutralizing gas configured to neutralize the etchant gas.

12 Claims, 3 Drawing Sheets

NEUTRALIZING GAS SYSTEM FOR FURNACE

This application claims the benefit of priority to Dutch Patent Application No. 2019811, filed on Oct. 26, 2017, which claims the benefit of priority to U.S. Provisional Application Ser. No. 62/551,372 filed on Aug. 29, 2017, the content of which is relied upon and incorporated herein by reference in its entirety.

FIELD OF THE DISCLOSURE

The disclosure relates to optical preform furnaces, and more particularly to optical preform furnaces incorporating a neutralizing gas system.

BACKGROUND

In the formation of multimode optical preforms, a centerline etch step may be performed using etching agents to remove a centerline silica-containing layer of the preform. In other embodiments, core preforms can form centerline seeds upon subsequent processing which may adversely impact the performance and yield of the optical fiber drawn from these preforms. To address the issue of seeds in these preforms, the centerline may be etched after the preform is consolidated using an etching agent through the centerline.

Etching agents used in the centerline are transported into a furnace the preform is positioned in. In addition to etching the preform, the etching agent may also etch away a muffle within the furnace resulting in significant reduction of the muffle lifetime.

SUMMARY OF THE DISCLOSURE

According to one aspect of the present disclosure, a method of preparing an optical preform, comprises the steps of: positioning an optical preform comprising silica within a cavity of a furnace; passing an etchant gas into the furnace and at least one of through an open channel defined in the optical preform and around the optical preform; and passing a neutralizing gas into the cavity of the furnace, the neutralizing gas configured to neutralize the etchant gas.

According to another aspect of the present disclosure, a method of operating a furnace, comprises the steps of: positioning an optical preform within a muffle of a furnace; passing an etchant gas comprising fluorine at a first molar flow rate into the furnace and through a centerline channel of the optical preform; and passing a neutralizing gas comprising silicon at a second molar flow rate into the cavity of the furnace configured to neutralize the etchant gas, wherein a ratio of the first molar flow rate into the furnace to the second molar flow rate into the furnace is from about 0 to about 2.

According to yet another aspect of the present disclosure, a furnace assembly includes a muffle defining a cavity. The muffle includes silicon. An optical preform is positioned within the cavity. The preform defines an open channel having an entrance aperture and an exit aperture. An etchant gas system is fluidly coupled with the preform and is configured to pass an etchant gas into the open channel of the optical preform. A neutralizing gas system is configured to pass a neutralizing gas into the cavity, wherein the neutralizing gas is configured to neutralize the etchant gas.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
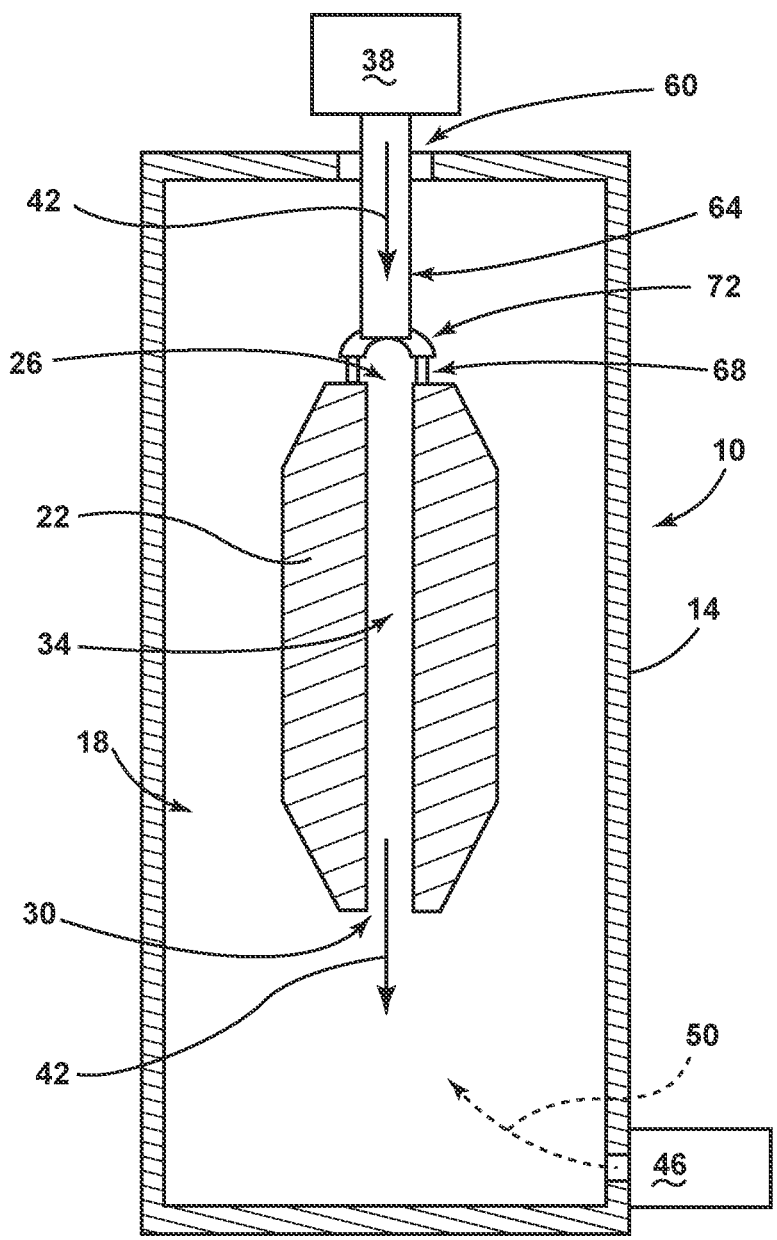
FIG. 1 is a schematic view of a furnace used to prepare an optical preform, according to at least one example.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIG. 1, reference numeral 10 generally refers to a furnace assembly 10. The furnace assembly 10 includes a muffle 14 defining a cavity 18. An optical preform 22 is positioned within the cavity 18. The optical preform 22 defines an entrance aperture 26, an exit aperture 30 and an open channel 34. An etching gas system 38 is fluidly coupled with the optical preform 22 and is configured to pass an etchant gas 42 into the optical preform 22. A neutralizing gas system 46 is configured to pass a neutralizing gas 50 into the cavity 18 of the furnace assembly 10. According to various examples, the neutralizing gas 50 is configured to neutralize the etchant gas 42.

The furnace assembly 10 is configured to provide a heated environment for the optical preform 22. The furnace assembly 10 may be a consolidation furnace, a redraw furnace or other types of furnaces used with optical preforms 22. The furnace assembly 10 is configured to heat the cavity 18 within the muffle 14 to temperature of from about 800° C. to about 1600° C. For example, the furnace assembly 10 may be configured to heat the cavity to a temperature of about 800° C., 900° C., 1000° C., 1100° C., 1200° C., 1300° C., 1400° C., 1500° C., 1600° C. or greater. Further, the furnace assembly 10 may be configured to heat the cavity 18 to a temperature of from about 800° C. to about 1600° C. In some examples, the furnace assembly 10 may be configured to heat the cavity 18 to a temperature of from about 1000° C. to about 1600° C. In various embodiments, the furnace assembly 10 may be configured to heat the cavity 18 to a temperature of from about 1200° C. to about 1600° C. It will be understood that the cavity 18 may have a uniform temperature across the length of the cavity 18, or may have one or more zones which have a greater heat relative to the rest of the cavity 18. For example, the cavity 18 may be hotter (e.g., about 1200° C. or greater) proximate the exit aperture 30 of the optical preform 22 relative to a temperature (e.g., about 1000° C. or less) proximate the entrance aperture 26 of the optical preform 22.

The muffle 14 is positioned within the furnace assembly 10 to define the cavity 18 within which the optical preform 22 is positioned. The muffle 14 may define a furnace exhaust 60 positioned towards a top of the muffle 14. The furnace exhaust 60 may allow for an equalizing of the pressure within the cavity 18 and the surrounding environments or for the removal of various gases produced within the furnace assembly 10. The muffle 14 may be composed of a refractory material which both contains heat within the furnace assembly 10 and protects other components of the furnace assembly 10. According to various examples, the refractory material of the muffle 14 may include silicon. For example, the muffle 14 may be composed of quartz, silica and/or other silicon containing compounds. Although depicted as including a single muffle 14, it will be understood that the furnace assembly 10 may include multiple muffles 14. For example, the furnace assembly 10 may include a primary muffle and a sacrificial muffle which is positioned closer to the optical preform 22. As will be explained in greater detail below, use of refractory materials of the muffle 14 which have the same or similar composition to that of the optical preform 22 may have deleterious effects when the etchant gas 42 is used.

The optical preform 22 is suspended within the muffle 14 by a tube 64 and an integral handle 68. Tube 64 extends out of the furnace exhaust 60 to couple with the etching gas system 38. The tube 64 is fluidly coupled with both the etching gas system 38 and the optical preform 22 such that the etchant gas 42 may be passed in from the etching gas system 38 into the optical preform 22. For example, the tube 64 and integral handle 68 may be configured to perfuse the etchant gas 42 optical preform 22 and/or pass the etchant gas 42 into the open channel 34. The tube 64 may be composed of a metal, a ceramic and/or other materials capable of withstanding the heat generated by the furnace assembly 10. Further, the tube 64 may be configured to resist etching by the etchant gas 42. The tube 64 is coupled to the integral handle 68 through a seal 72. Like the tube 64, the seal 72 may be configured to resist the temperature of the furnace assembly 10 as well as etching by the etchant gas 42. The integral handle 68 may be formed with the optical preform 22 or may be attached after formation of the optical preform 22. The integral handle 68 may function as a point to hold, move or suspend the optical preform 22.

The optical preform 22 may be an optical fiber core preform and/or an optical fiber cladding preform. Such optical preforms 22 may be utilized in the formation of doped or undoped single mode or multimode optical fibers. According to various examples, the optical preform 22 may be formed via outside vapor deposition (OVD). OVD processes to form the optical preforms 22 may involve deposition of silica or doped-silica soot (e.g., $SiO_2$ and $GeO_2$) onto a substrate configured to accept the soot. In an exemplary manufacturing process, the optical perform 22 is formed via soot deposition on a bait rod (e.g., a ceramic substrate rod configured to accept the soot). The bait rod may have a cylindrical, square or other higher order polygonal cross-sectional shape. It will be understood that the optical preform 22 may be doped at this point or flood doped at a later point. Exemplary dopants may include $GeO_2$, $Al_2O_3$, $P_2O_5$, Br, Cl and/or F. For example, as part of the soot deposition process to form the optical preform 22, the first few deposition passes (100 microns to 500 microns of soot deposit) of soot (e.g., in an OVD process) are $SiO_2$ optionally doped with a relatively small amount of $GeO_2$ (e.g., 10-18 wt. % of $GeO_2$), followed by a $SiO_2$ soot deposition with a greater amount (e.g., about twice as much) of $GeO_2$, in order to allow the desired $GeO_2$—$SiO_2$ profile near the bait rod to be achieved. It will be understood that the optical preform 22 may additionally or alternatively be formed via modified chemical vapor deposition, physical vapor deposition and/or through a soot pressing process. The soot is applied to the bait rod may be composed of nanometer and/or micrometer scale particles of $SiO_2$ and/or dopant particles. The finished optical preforms 22 may have an outer diameter of from about 20 mm to about 200 mm. The diameter of the entrance 26 may be about 20 mm or less, about 10 mm or less, about 5 mm or less, about 4 mm or less, or about 3 mm or less. For example, the diameter of the entrance 26 may be from about 1 mm to about 20 mm or from about 3 mm to about 10 mm.

The bait rod is subsequently removed from the optical preform 22 to form the open channel 34. The open channel 34 of the optical preform 22 may extend through a portion, a majority, substantially all or completely through the optical preform 22. The open channel 34 may be positioned along a centerline of the optical preform 22. In such an example, the open channel 34 may also be referred to as a centerline channel, an open cavity and/or an open centerline. It will be understood that the bait rod may be positioned off-center of the optical preform 22 or that multiple bait rods (e.g., and therefore multiple open cavities 34) are contemplated. Removal of the bait rod from the optical preform 22 may form the entrance 26, the exit 30 and the open channel 34 of the preform 22. Once the bait rod has been removed, the optical preform 22 is placed in a consolidation furnace (e.g., the furnace assembly 10 or another furnace) for drying and consolidation. Drying of the optical preform 22 may be accomplished by placing the preform 22 in a halogen containing atmosphere (e.g., $Cl_2$) to remove moisture (i.e., OH). Next, the optical preform 22 may be consolidated (e.g., sintered into void free glass) to form a consolidated optical preform 22. It will be understood that the optical preform, prior to sintering and consolidation, may be opaque and/or translucent to visible and non-visible light, while after consolidation, the preform 22 may be transparent to visible and non-visible light.

The consolidated optical preforms 22 can be directly drawn into optical fiber or first be further processed to collapse the open channel 34 in a redraw furnace prior to drawing the preform 22 into an optical fiber. According to various examples, the open channel 34 of the optical preform 22 is at least partially collapsed prior to being drawn into fiber. Collapsing of the open channel 34 may be performed at an elevated temperature (e.g., at about 1700° C. to 2200° C.) and optionally under a vacuum. Collapsed preforms can also be referred to as preform canes. In some cases these canes are referred to as core canes which start from a core preform. The optical preform 22 may be transformed into a core cane by heating the preform 22 at temperatures at or above the softening point of the glass and the deposited material and by collapsing the preform 22 to remove the entrance 26, the exit 30 and the open channel 34.

According to various examples, an etching process using the etching gas system 38 and the etchant gas 42 may be used to etch a portion of the optical preform 22. In some examples, the etchant gas 42 may be passed into the optical preform 22 to etch an interior (e.g., the open channel 34) of the preform 22. In other examples, the etchant gas 42 may be passed along an exterior of the optical preform 22 to etch an exterior of the optical preform 22. As such, the etchant gas 42 may be passed into the furnace assembly 10 at least one of through the open channel 34 defined in the optical preform 22 and around the optical preform 22. It will be understood that in examples where the etchant gas 42 is passed on an exterior of the optical preform 22, the etchant gas 42 may or may not pass through the tube 64 and/or integral handle 68. In examples where the etchant gas 42 is passed into the open channel 34, passing of the etchant gas 42 may be performed prior to collapsing and/or sintering of the optical preform 22. The etchant gas 42 may be passed in a vapor-phase to remove the first few deposition passes (e.g., in an OVD manufacturing method) or a predetermined depth (e.g., for a soot pressing method). Such a feature may be advantageous in controlling a dopant concentration profile of the optical preform 22 and/or in removing defects (e.g., interior and/or exterior) from the optical preform 22 prior to collapsing the preform 22 which may lead to defects in optical fibers drawn from the optical preform 22. For example, as part of the soot deposition process, the first few passes (approximately 100 microns to 500 microns) of soot may have an undesirable amount (e.g., low or high relative to a target concentration) of dopant near the open channel 34. In another example, removal of the bait rod from the optical preform 22 may result in the formation of aberrations (e.g., holes, rough spots, etc.) on the preform 22 proximate the centerline 34. The aberrations may also be known as centerline seeds. Formation of centerline seeds can adversely impact the performance and yield of an optical fiber drawn from these preforms 22.

Etching of the preform 22 may be accomplished by passing the etchant gas 42 from the etching gas system 38, through the tube 64, and into the optical preform 22. Introduction of the etchant gas 42 through the open channel 34 allows the etchant gas 42 to effectively etch the open channel 34 of the preform 22. The etchant gas 42 is a gas, which under the appropriate conditions (e.g., temperature and concentration) is capable of removing crystalline or vitreous oxide materials through chemical action. According to various examples, the etchant gas 42 may include a fluorine containing gas, but it will be understood that other etchant gasses 42 may be utilized without departing from the teachings provided herein. For example, the etchant gas 42 may include $SF_6$, $SOF_4$, $CF4$, $SF_6$, $NF_3$, $C_2F_6$, $C_4F_8$, $CHF_3$, $CClF_3$, $CCl_2F_2$, $CCl_3F$, $SiF_4$ and combinations thereof. The etchant gas 42 may include one or more other gasses with little or no etching capability. For example, the etchant gas 42 may include one or more carrier gasses configured to carry the etchant gas 42. For example, the etchant gas 42 may include oxygen, helium, nitrogen, argon and/or other carrier gasses.

The etching gas system 38 may pass the etchant gas 42 into the furnace assembly 10 at a flow rate of about 25 standard cubic centimeters per minute ("sccm"), about 50 sccm or more, about 90 sccm or more, about 150 sccm or more, about 200 sccm, about 300 sccm or more, about 500 sccm or more, about 1000 sccm or more, or about 3000 sccm or more through the open channel 34. In some examples, the flow rate of the etchant gas 42 into the furnace assembly 10 is from about 25 sccm to about 10000 sccm, or from about 25 sccm to about 3000 sccm, or from about 25 sccm to about 1000 sccm. The temperature of the etchant gas 42 contacting the optical preform 22 may be about 1700° C. or less, about 1600° C. or less, about 1550° C. or less, about 1500° C. or less, about 1400° C. or less, about 1300° C. or less. In some examples, the temperature of the etchant gas 42 contacting the optical preform 22 is from about 800° C. to about 1700° C., or from about 1000° C. to about 1600° C., or from about 1200° C. to about 1600° C. The etchant gas 42 may be passed through the optical preform 22 for a sufficient time that about 100 microns or greater, about 200 microns or greater, about 300 microns or greater, about 400 microns or greater, about 500 microns or greater, about 600 microns or greater, about 700 microns or greater, about 800 microns or greater, about 900 microns or greater, or about 1000 microns or greater may be removed from the open channel 34. In some examples, the etchant gas 42 is passed through the optical preform 22 for a sufficient time at a sufficient temperature to remove from the open channel 34 from about 100 microns to about 3000 microns, or from about 100 microns to about 2000 microns, or from about 100 microns to about 1000 microns. It will be understood that the thickness removed from the open channel 34 is expressed as a radial distance.

As explained above, the etching gas system 38 may be configured to pass the etchant gas 42 into the entrance aperture 26 of the optical preform 22, through the open channel 34 and out the optical preform 22 through the exit aperture 30. As the cavity 18 of the furnace assembly 10 is at an elevated temperature proximate the exit aperture 30, excess etchant gas 42 (e.g., etchant gas 42 which has not reacted with the optical preform 22) may contact the muffle 14 and begin etching silicon containing examples of the muffle 14. Such an outcome may be disadvantageous in decreasing the useable lifetime of the muffle 14. Accordingly, it may be advantageous in introduce the neutralizing gas 50 into the muffle 14 and/or proximate the exit aperture 30.

The neutralizing gas system 46 is configured to pass, or inject, the neutralizing gas 50 into the cavity 18 proximate the exit aperture 30. As explained above, the neutralizing gas 50 is configured to neutralizing the etching effect of the etchant gas 42 such that the etchant gas 42 is substantially inert to the muffle 14. In other words, the neutralizing gas 50 may chemically react with the etchant gas 42 to neutralizing and/or diminish the etching effect of the etchant gas 42 relative to silicon containing compounds. According to various examples, the neutralizing gas 50 may include a silicon containing gas. Silicon containing examples of the neutralizing gas 50 may include at least one of $SiCl_4$, $Si_2Cl_6$, $Si_2OCl_6$, $SiHCl_3$, $SiH_2Cl_2$, $SiH_3Cl$, $SiBr_4$, $SiH_4$, $SiCl_3F$, $SiCl_2F_2$, $SiClF_3$, Octamethylcyclotetrasiloxane, and $SiR_XF_Y$ where Y≤3, 1≤X≤4, and R is an alkyl, aryl or H moiety, and/or combinations thereof.

Use of silicon containing gasses in the neutralizing gas 50 are configured to react with the etchant gas 42 to mitigate and/or deplete the ability of the etchant gas 42 to etch the muffle 14. As can be seen by Equation 1, fluorine containing examples of the etchant gas 42 (e.g., SF6), without the neutralizing gas 50, will react with silicon containing examples of the muffle 14 and the optical preform 22 (e.g., $SiO_2$) alike.

$$SF_6+1.5SiO_2\rightarrow 1.5SiF_4+SO_3 \quad (Eq.\ 1)$$

The introduction of silicon containing examples of the neutralizing gas 50 (e.g., $SiCl_4$) can be shown to neutralizing the etching effects of fluorine containing examples of the etchant gas 42 ($SF_6$) by equation 2.

$$SF_6+1.5SiCl_4\rightarrow 1.5SiF_4+SCl_6 \quad (Eq.\ 2)$$

As shown by Equation 3, the introduction of silicon containing examples of the neutralizing gas 50 (e.g., $SiCl_4$) can be shown to preferentially neutralize the etching effects of fluorine containing examples of the etchant gas 42 ($SF_6$) with minimal to no effect on silicon containing examples of the muffle 14 (e.g., $SiO_2$). Such a preferential reaction is believed to occur due to the chemical reaction availability of the vapor phase of the neutralizing gas 50 relative to the chemical reaction availability of the solid muffle 14.

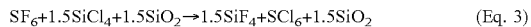

$$SF_6+1.5SiCl_4+1.5SiO_2\rightarrow 1.5SiF_4+SCl_6+1.5SiO_2 \quad (Eq.\ 3)$$

The neutralizing gas system 46 is configured to pass the neutralizing gas 50 into the furnace assembly 10 at such a rate that a molar ratio of the etchant gas 42 entering the furnace assembly 10 to the neutralizing gas 50 entering the furnace assembly 10 may be about 0.1, about 0.2 or greater, about 0.3 or greater, about 0.4 or greater, about 0.5 or greater, about 0.6 or greater, about 0.7 or greater, about 0.8 or greater, about 0.9 or greater, about 1.0 or greater, about 1.1 or greater, about 1.2 or greater, about 1.3 or greater, about 1.4 or greater, about 1.5 or greater, about 1.6 or greater, about 1.7 or greater, about 1.8 or greater, about 1.9 or greater, about 2.0 or greater, about 3.0 or greater, about 4.0 or greater, or about 5.0 or greater. In some examples, the molar ratio of the etchant gas 42 entering the furnace assembly 10 to the neutralizing gas 50 entering the furnace assembly 10 is from about 0 to about 10, or from about 0 to about 5, or from about 0 to about 2, or from about 0.1 to about 2. In other words, the molar ratio of the etchant gas 42 entering the furnace assembly 10 to the neutralizing gas 50 entering the furnace assembly 10 is >0 and ≤2 or >0 and ≤1.

Figure 2:
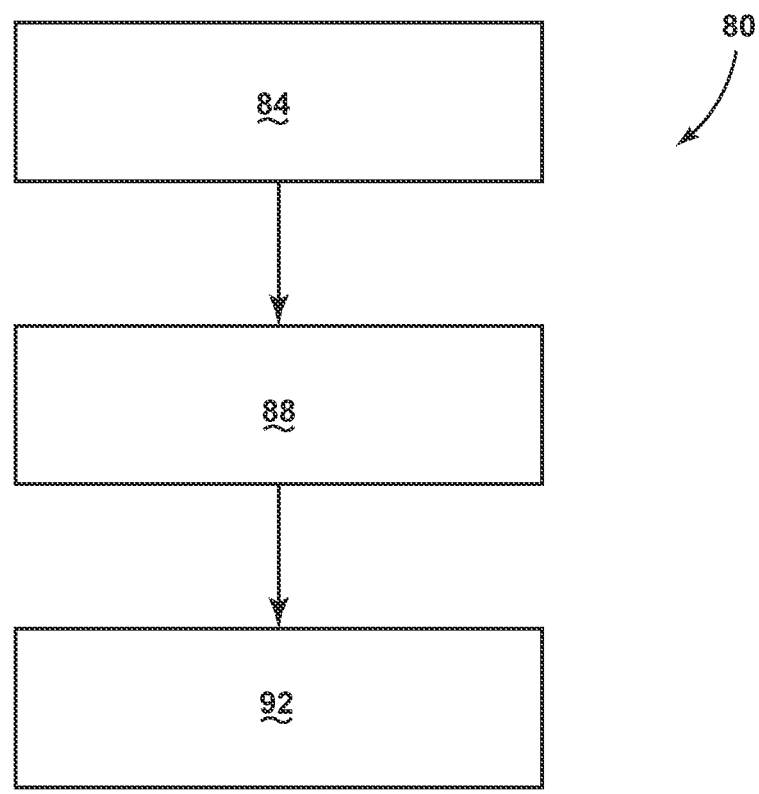
FIG. 2 is a schematic flow diagram of an exemplary method of operating the furnace of FIG. 1, according to at least one example.

Referring now to FIG. 2, an exemplary method 80 of operating the furnace assembly 10 is depicted. The method 80 may begin with a step 84 of positioning the optical preform 22 within the cavity 18 of the furnace assembly 10. As explained above, the optical preform 22 is suspended within the cavity 18 of the muffle 14 via the tube 64 and the integral handle 68. The furnace assembly 10 may be heated to a temperature of about 1000° C. or greater. In other examples, the furnace assembly 10 may be heated to a temperature from about 1000° C. to about 1600° C. In some examples, the furnace assembly 10 is be heated to a temperature of from about 800° C. about 1600° C., or from about 1000° C. to about 1600° C., or from about 1200° C. to about 1600° C.

Next, a step 88 of passing the etchant gas 42 into the furnace assembly 10 and at least one of through the open channel 34 defined in the optical preform 22 and around the optical preform 22 is performed. As explained above, the etchant gas 42 may be passed through the open channel 34, through the tube 64 and/or around an exterior of the optical preform 22. The etchant gas 42 may be passed into the furnace assembly 10 at first molar flow rate. In examples where the etchant gas 42 is passed into the optical preform 22, the etching gas system 38 passes the etchant gas 42 into the optical preform 22 through the tube 64 and into the optical preform 22 through the entrance aperture 26. The etchant gas 42 then travels through the centerline channel 34 and passes into the cavity 18 through the exit aperture 30. The passing of the etchant gas 42 has the effect of etching the open channel 34 of the optical preform 22. In examples where the etchant gas 42 is passed around the optical preform 22, the passing of the etchant gas 42 has the effect of etching the exterior of the optical preform 22.

Next, a step 92 of passing the neutralizing gas 50 into the cavity 18 of the furnace assembly 10 is performed. As explained above, the neutralizing gas 50 is configured to neutralize the etchant gas 42. The neutralizing gas 50 is passed into the cavity 18 proximate an end of the optical preform 22 (e.g., the exit aperture 30 of the optical preform 22 open channel 34). The neutralizing gas 50 may be passed at such a second flow rate such that a ratio of the first molar flow rate of the etchant gas 42 to the second molar flow rate of the neutralizing gas 50 is about 2 or less. In other words, the passing of the neutralizing gas 50 may be at a flow rate such that a molar ratio of etchant gas 42 to neutralizing gas 50 entering the furnace assembly 10 is about 2 or less, or about 1 or less.

Use of the present disclosure may offer a variety of advantages. First, use of the neutralizing gas 50 offers a simple and low-cost method of extending the useable life of the muffle 14. As the replacement of the muffle 14 in the furnace assembly 10 requires both a new muffle 14 and down time of the furnace assembly 10, increasing the usable life of the muffle 14 may increase the furnace assembly 10 output as well as decrease costs associated with maintenance of the furnace assembly 10. Second, use of the neutralizing gas 50 may allow for a more aggressive etching of the optical preform 22. For example, it may be advantageous to increase the amount, or concentration, of etchant gas 42 passed into the furnace assembly 10 (e.g., to decrease etching time and/or depth of etch). As the present disclosure allows the excess etchant gas 42 to be neutralized prior to contact with the muffle 14, a greater concentration of etchant gas 42 may be passed through the preform 22 thereby decreasing etching time without a corresponding decrease in usable lifetime of the muffle 14. Third, as silicon containing examples of the neutralizing gas 50 are already at use in many manufacturing steps of the optical preform 22, specialty gasses may not necessarily be required to implement the present disclosure.

EXAMPLES

Figure 3:
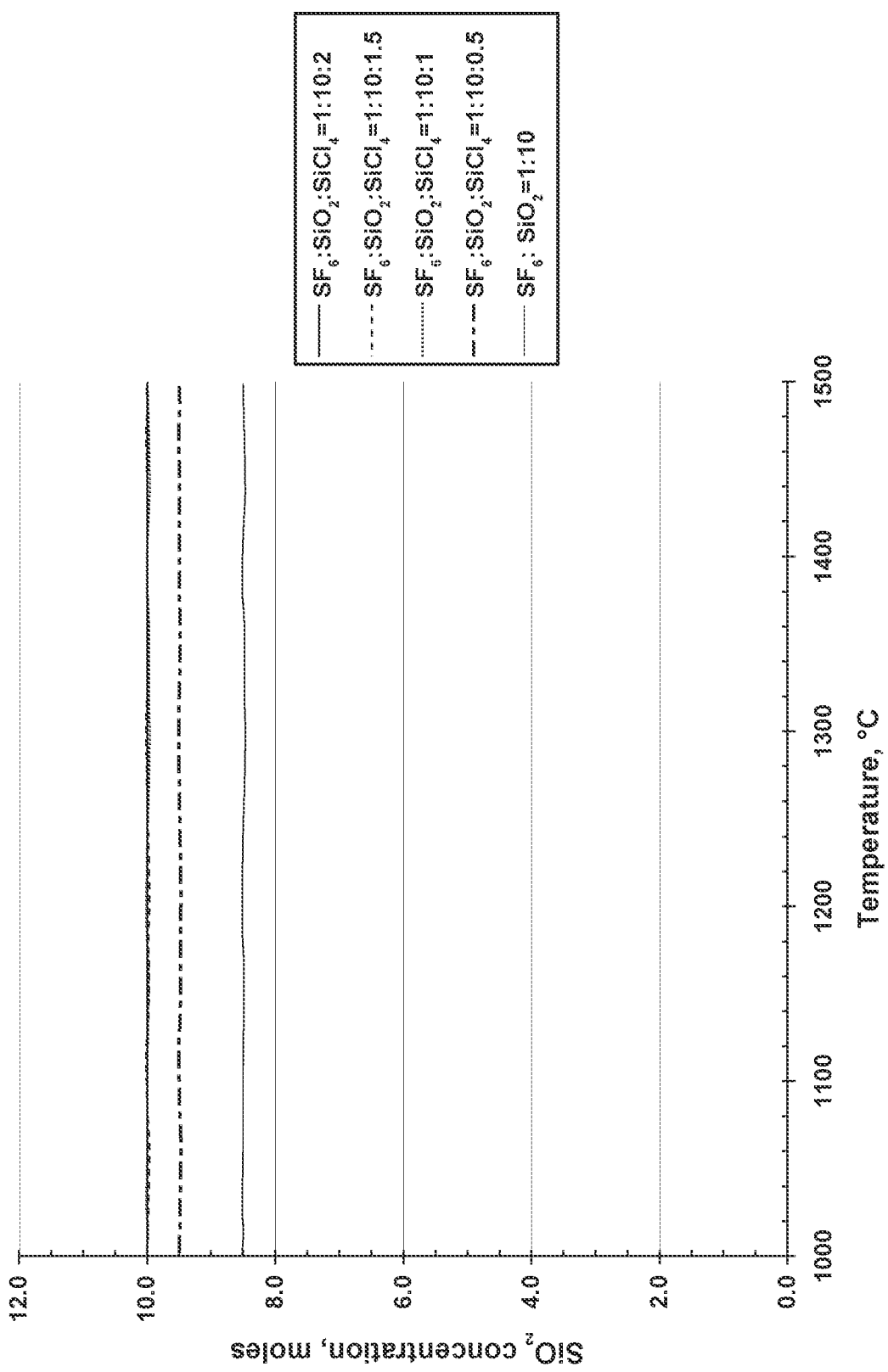
FIG. 3 is a graph of $SiO_2$ concentration as a function of $SiCl_4$ and temperature.

Referring now to FIG. 3, modeled calculations of equilibrium concentrations of a $SiO_2:SF_6:SiCl_4$ system at temperatures between 1000° C. and 1500° C. are provided. For the illustrative calculations, 10 moles of $SiO_2$ (e.g., representing silica examples of the muffle 14) and 1 mole of $SF_6$ (e.g., the etchant gas 42) are provided. As can be seen from FIG. 3 and Table 1, the increasing use of $SiCl_4$ (e.g., the neutralizing gas 50) results in a greater retention of $SiO_2$.

TABLE 1

| Temperature [C.] | SF6:SiO2:SiCl4 = 1:10:0 | SF6:SiO2:SiCl4 = 1:10:0.5 | SF6:SiO2:SiCl4 = 1:10:1 | SF6:SiO2:SiCl4 = 1:10:1.5 | SF6:SiO2:SiCl4 = 1:10:2 |
|---|---|---|---|---|---|
| 1000 | 8.5 | 9.5 | 10.0 | 10.0 | 10.0 |
| 1060 | 8.5 | 9.5 | 10.0 | 10.0 | 10.0 |
| 1110 | 8.5 | 9.5 | 10.0 | 10.0 | 10.0 |
| 1170 | 8.5 | 9.5 | 10.0 | 10.0 | 10.0 |
| 1220 | 8.5 | 9.5 | 10.0 | 10.0 | 10.0 |
| 1280 | 8.5 | 9.5 | 10.0 | 10.0 | 10.0 |
| 1330 | 8.5 | 9.5 | 10.0 | 10.0 | 10.0 |
| 1390 | 8.5 | 9.5 | 10.0 | 10.0 | 10.0 |
| 1440 | 8.5 | 9.5 | 10.0 | 10.0 | 10.0 |
| 1500 | 8.5 | 9.5 | 10.0 | 10.0 | 10.0 |

Table 1 shows the calculated $SiO_2$ concentration at equilibrium. For the case where there is no $SiCl_4$ and $SiO_2/SF_6$ molar ratio is 10, it is calculated that the $SiO_2$ concentration at equilibrium is reduced by 15% because of the etching reaction. The $SiO_2$ concentration is calculated to reduce by 5% for a $SiCl_4/SF_6$ molar ratio of 0.5. The $SiO_2$ concentration is calculated to reduce by less than 0.2% for a $SiCl_4/SF_6$ molar ratio of greater than 1. The provided results show that the addition of $SiCl_4$ inhibits $SF_6$ etching of the $SiO_2$. In practical terms, the data shows that the introduction of silicon containing examples of the neutralizing gas 50 neutralizes the excess etchant gas 42 such that the silicon containing examples of the muffle 14 experience decreased etching. Such a decrease in muffle 14 etching results in a corresponding increase in usable lifetime of the muffle 14.

TABLE 2

| Examples | Tube | Etching Gas | Carrier Gas | Neutralizing Gas | Tube Start ID | Tube End ID | Tube Mass Loss |
|---|---|---|---|---|---|---|---|
| Comparative Example 1 | Silica | SF$_6$ (0.10 SLM) | He (0.58 SLPM) | SiCl$_4$ (0.0 SLPM) | 4.00 mm | 4.6 mm | 3.9 g |
| Example 1 | Silica | SF$_6$ (0.10 SLPM) | He (0.38 SLPM) | SiCl$_4$ (0.20 SLPM) | 4.00 mm | 4.00 mm | 0 g |

Table 2 shows the quantitative results of experimental data. Comparative Example 1 was a silica based tube (e.g., the muffle 14) having a length of 1.25 meters, an outer diameter of 6.37 mm. The silica tube had a centerline channel (e.g., the open channel 34) with an inner diameter (ID) of 4.00 mm. The silica based tube of Comparative Example 1 was placed in a tube furnace (e.g., the furnace assembly 10) with each end sticking out of the tube furnace. The tube furnace had a 30 cm hot-zone and there were insulated end-caps having a hole in the center through which the silica tube was placed. The furnace temperature was held at 1125° C. The open cavity of this silica tube was then vapor phase etched at this temperature by flowing $SF_6$ (e.g., the etchant gas 42) and He (e.g., a carrier gas) at a flow rate of about 0.10 and 0.58 SLPM, respectively, through the open cavity of the silica tube for 120 minutes. Immediately following this process, the silica tube was purged with flowing He at 0.58 SLPM continuously and the tube furnace was shut off and allowed to cool to room temperature. The silica tube was then removed from the tube furnace and weighed on an analytical balance. The silica tube had a mass loss of about 3.9 grams as a result of the $SF_6$ etching process. The inner diameter of the silica tube that was in the tube furnace was measured in several places and was etched to about 4.6-4.7 mm (e.g., about 0.3 mm to 0.35 mm wall thickness removed). The inner diameter of the silica tube was also found to be slightly surface pitted (about 0.1 mm to 0.5 mm diameter) from the etching process. The inner diameter of the portion of the silica tube outside the tube furnace remained pristine and un-etched at 4.00 mm inner diameter.

The experimentation of Example 1 was carried out in a similar manner to that of Comparative Example 1, but include $SiCl_4$ (e.g., the neutralizing gas 50). In Example 1, a silica based tube (e.g., the muffle 14) having a length of 1.25 meters, an outer diameter of 6.37 mm. The silica tube had an open cavity (e.g., the centerline channel 34) with an inner diameter of 4.00 mm. The silica based tube of Example 1 was placed in a tube furnace (e.g., the furnace assembly 10) with each end sticking out of the tube furnace. The tube furnace had a 30 cm hot-zone and there were insulated end-caps having a hole in the center through which the silica tube was placed. The furnace temperature was held at 1125°

C. The open cavity of this silica tube was then vapor phase exposed at this temperature to flowing $SF_6$ (e.g., the etchant gas 42), He (e.g., a carrier gas) and $SiCl_4$ (e.g., the neutralizing gas 50) at 0.10 SLPM, 0.38 SLPM and 0.20 SLPM, respectively, through the open cavity of the silica tube for 120 minutes. Immediately following this process, the silica tube was purged with flowing He at 0.58 SLPM continuously and the tube furnace was shut off and allowed to cool to room temperature. The silica tube was then removed from the furnace and weighed on an analytical balance. The silica tube had a mass loss of 0.0 grams as a result of the $SF_6$ and $SiCl_4$ exposure process. The inner diameter of the silica tube that was in the tube furnace was measured in several places and was found to be pristine, un-etched and retained a 4.00 mm inner diameter. The portion of the inner diameter of the silica tube outside the tube furnace also remained pristine and un-etched with a 4.00 mm inner diameter. These results demonstrate that having a silicon containing gas (e.g., the neutralizing gas 50) in the vapor phase in the presence of silica etchant gas (e.g., the fluorine containing etchant gas 42), prevents the etchant gas from etching the silica tube, by having the neutralizing gas react with the etchant gas.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

What is claimed is:

1. A method of preparing an optical preform, comprising the steps of:
    positioning an optical preform comprising silica within a cavity of a furnace;
    passing an etchant gas into the furnace and at least one of through an open channel defined in the optical preform and around the optical preform after the optical preform has been consolidated; and
    passing a neutralizing gas into the cavity of the furnace when the etchant gas passes into the furnace, wherein the neutralizing gas is configured to neutralize the etchant gas, and wherein the neutralizing gas is passed at a flow rate such that a molar ratio of etchant gas entering the furnace to neutralizing gas entering the furnace is $\geq 1.1$.

2. The method of claim 1, further comprising the step of:
    etching the open channel of the optical preform using the etchant gas.

3. The method of claim 1, wherein the step of passing the etchant gas further comprises: passing the etchant gas through a centerline of the optical preform.

4. The method of claim 3, further comprising the step of:
    passing the neutralizing gas into the cavity of the furnace proximate an exit of the open channel of the optical preform.

5. The method of claim 1, wherein the step of passing a neutralizing gas further comprises the step of:
    passing the neutralizing gas at a flow rate such that a molar ratio of etchant gas entering the furnace to neutralizing gas entering the furnace is $\geq 1.1$ and $\leq 2.0$.

6. The method of claim 5, wherein the step of passing a neutralizing gas further comprises the step of:
    passing the neutralizing gas at a flow rate such that a molar ratio of etchant gas entering the furnace to neutralizing gas entering the furnace is $>0.2$ and $\leq 1$, wherein the neutralizing gas comprises $SiCl_4$ and the etchant gas comprises $SF_6$.

7. The method of claim 1, further comprising the step of:
    heating the furnace to about 1000° C. or greater.

8. The method of claim 1, wherein the step of passing a neutralizing gas further comprises the step of:
    passing the neutralizing gas at a flow rate such that a molar ratio of etchant gas entering the furnace to neutralizing gas entering the furnace is $\geq 4$.

9. The method of claim 1, wherein the step of passing a neutralizing gas further comprises the step of:
    passing the neutralizing gas at a flow rate such that a molar ratio of etchant gas entering the furnace to neutralizing gas entering the furnace is $\geq 5$.

10. A method of operating a furnace, comprising the steps of:
    positioning an optical preform within a muffle of a furnace;
    passing an etchant gas comprising fluorine at a first molar flow rate into the furnace and through a centerline channel of the optical preform after the optical preform has been consolidated; and
    passing a neutralizing gas comprising silicon at a second molar flow rate into the cavity of the furnace when the etchant gas is passed into the furnace, wherein the neutralizing gas is configured to neutralize the etchant gas, and wherein a ratio of the first molar flow rate into the furnace to the second molar flow rate into the furnace is $\geq 1.1$ and $\leq 2$.

11. The method of claim 10, further comprising the step of:
    heating the furnace to a temperature from about 1000° C. to about 1600° C.

12. The method of claim 10, wherein the step of positioning the optical preform within a muffle of the furnace further comprises the step of:
    positioning the optical preform within a muffle comprising silicon.

* * * * *